US005753580A

United States Patent [19]
Hayashi et al.

[11] Patent Number: 5,753,580
[45] Date of Patent: May 19, 1998

[54] EXHAUST EMISSION CONTROL CATALYST COMPRISING CERIUM

[75] Inventors: Tadayoshi Hayashi; Shinichi Kikuchi, both of Saitama, Japan

[73] Assignee: Honda Giken Kogyo Kabushiki Kaisha, Tokyo, Japan

[21] Appl. No.: 297,418

[22] Filed: Aug. 29, 1994

[30] Foreign Application Priority Data

Aug. 30, 1993 [JP] Japan ..................... 5-213943

[51] Int. Cl.⁶ ..................... B01J 23/00; B01J 8/02
[52] U.S. Cl. ..................... 502/304; 502/327; 502/328; 502/333; 502/334; 502/340; 502/341; 502/349; 423/213.5
[58] Field of Search ..................... 502/439, 527, 502/332, 333, 334, 304, 349, 327, 328, 340, 341; 423/213.5

[56] References Cited

U.S. PATENT DOCUMENTS

| | | | |
|---|---|---|---|
| 5,019,546 | 5/1991 | Murakami et al. | 502/303 |
| 5,254,519 | 10/1993 | Wan et al. | 502/252 |
| 5,376,610 | 12/1994 | Takahata et al. | 502/66 |

*Primary Examiner*—Glenn Caldarola
*Assistant Examiner*—In Suk Bullock
*Attorney, Agent, or Firm*—Armstrong, Westerman, Hattori, McLeland & Naughton

[57] ABSTRACT

A bottom washcoat layer 2 and a top washcoat layer 3 including alumina ($Al_2O_3$) are sequentially laminated onto the surface of a monolith carrier 1. Cerium, zirconium and palladium are carried in the bottom washcoat layer 2, and platinum, rhodium, barium and cerium are carried in the top washcoat layer 3. The cerium content in the top washcoat layer 3 is set smaller than that in the bottom washcoat layer 2. This causes the hydrocarbon conversion performance of rhodium and the nitrogen conversion performance of platinum in the top washcoat layer 3 to be balanced properly, while maintaining the hydrocarbon conversion performance of palladium in the bottom washcoat layer, thereby providing an improved exhaust gas purification performance as a whole. In addition, platinum and palladium carried in separate washcoat layers make it possible to inhibit the formation of a platinum-palladium alloy under high temperature conditions to prevent a reduction in exhaust gas purification effect. Further, the heat deterioration of cerium can be inhibited by zirconium, and the alumina surface area can be stabilized by barium, thereby providing an improved durability of the catalyst under high temperature conditions.

11 Claims, 1 Drawing Sheet

EXHAUST EMISSION CONTROL CATALYST COMPRISING CERIUM

BACKGROUND OF THE INVENTION

1. Field of the Invention

The present invention relates to an exhaust emission control catalyst primarily used for an internal combustion engine of an automobile, and particularly, to an exhaust emission control catalyst comprising a bottom washcoat layer of alumina ($Al_2O_3$) and a top washcoat layer of alumina ($Al_2O_3$) sequentially laminated on a catalyst carrier, and catalytic constituents carried in the bottom and top washcoat layers, respectively.

2. Description of the Prior Art

There are such conventionally known exhaust emission control catalysts described in Japanese Patent Application Laid-open Nos. 170540/83, 19036/85, 240646/88 and 38892/91.

The exhaust emission control catalyst described in Japanese Patent Application Laid-open No. 170540/83 includes palladium (Pd) carried in the bottom washcoat layer, and platinum (Pt) and/or rhodium (Rh) carried in the top washcoat layer. The exhaust emission control catalyst described in Japanese Patent Application Laid-open No. 19036/85 includes platinum or palladium carried in the bottom washcoat layer, and a combination of rhodium and platinum or a combination of rhodium and palladium carried in the top washcoat layer. The exhaust emission control catalyst described in Japanese Patent Application Laid-open No. 240646/88 includes palladium or a combination of palladium and rhodium carried in the bottom washcoat layer, and platinum and an oxide of at least one of titanium (Ti), tellurium (Te), silicon (Si) and zirconium (Zr) carried in the top washcoat layer. The exhaust emission control catalyst described in Japanese Patent Application Laid-open No. 38892/91 includes platinum or rhodium carried in the bottom washcoat layer, and palladium and cerium (Ce) carried in the top washcoat layer.

In the above prior art catalysts, there is a trade-off between hydrocarbon and carbon monoxide conversion performance (oxidation reactions) and nitrogen oxide conversion performance (reduction reactions). If one of the two performances is enhanced, the other performance is degraded. It is therefore difficult to improve the total exhaust gas purification performance. The prior art catalysts are accompanied by a problem that if they are used for a long period of time under high temperature conditions, their performances are degraded. Therefore, an improvement in durability of such a catalyst is desired.

SUMMARY OF THE INVENTION

Accordingly, it is an object of the present invention to improve the hydrocarbon conversion performance, while maintaining the nitrogen oxide and carbon monoxide conversion performances, and to enhance the durability of the catalyst under high temperature conditions.

To achieve the above object, according to the present invention, there is provided an exhaust emission control catalyst comprising a bottom washcoat layer of alumina and a top washcoat layer of alumina which are sequentially laminated on a catalyst carrier, and catalyst constituents carried in the bottom and top washcoat layers, respectively, the bottom washcoat layer including at least cerium, zirconium and palladium carried therein, at respective loading contents of: cerium in a range of 10 to 40 g/l; zirconium in a range of 5 to 30 g/l; and palladium in a range of 0.2 to 2.0 g/l; the top washcoat layer including at least platinum, rhodium, barium and cerium carried therein without palladium and zirconium carried therein, at respective loading contents of: platinum in a range of 0.1 to 2.0 g/l; rhodium in a range of 0.05 to 0.65 g/l; barium in a range of 2 to 8 g/l; and cerium in a content smaller than that in the bottom washcoat layer, preferably the cerium in a minimum content of 5 g/l.

Thus, with the arrangement that palladium is carried in the bottom washcoat layer laminated on the catalyst carrier and platinum and rhodium are carried in the top washcoat layer in the above manner, the formation of a platinum-palladium alloy under high temperature conditions can be suppressed so as to prevent degradation in exhaust gas purification performance. Further, since the content of cerium in the top washcoat layer is smaller than that in the bottom washcoat layer, the nitrogen oxide conversion performance of platinum in the top washcoat layer and the hydrocarbon conversion performance of rhodium in the top washcoat layer can be exhibited with a good balance, while enhancing the hydrocarbon conversion performance of palladium in the bottom washcoat layer, thereby maintaining the total exhaust gas purification performance of both the washcoat layers at a high level. Further, the thermal deterioration of cerium can be suppressed by zirconium carried in the bottom washcoat layer, leading to an enhanced durability under high temperature conditions, and the surface area of alumina of the top washcoat carrying the platinum-cerium catalyst system can be stabilized by barium carried in the top washcoat layer, leading also to an enhanced durability under high temperature conditions.

The above and other objects, features and advantages of the invention will become apparent from the following description of a preferred embodiment, taken in conjunction with the accompanying drawings.

BRIEF DESCRIPTION OF THE DRAWINGS

FIGS. 1 and 2 illustrate a preferred embodiment of the present invention, wherein FIG. 1 is a perspective view of the entire monolithic carrier; and FIG. 2 is a partially enlarged sectional view of the monolithic carrier.

DESCRIPTION OF THE PREFERRED EMBODIMENT

Figure 1:
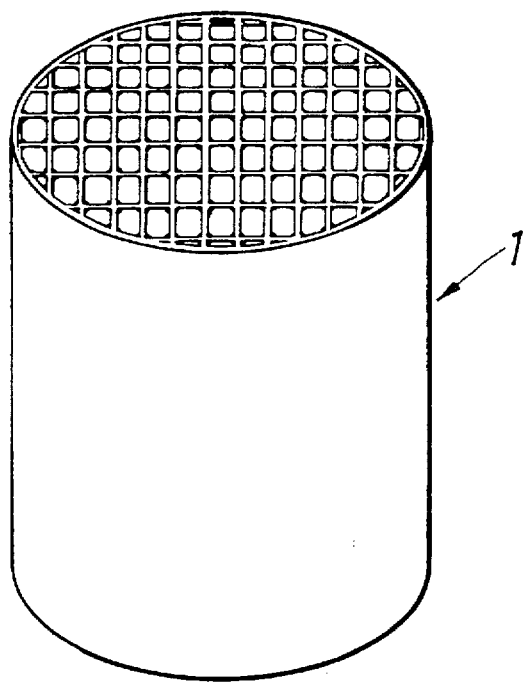

FIG. 1 shows a monolithic carrier 1 in a catalytic converter for an automobile. The carrier 1 is monolithically formed of a ceramic such as cordierite or a metal in a manner such that the inside of a cylindrically formed shell is divided into a honeycomb configuration or structure by a large number of partition walls extending so as to cross perpendicularly to one another and in parallel to the axial direction of the shell.

Figure 2:
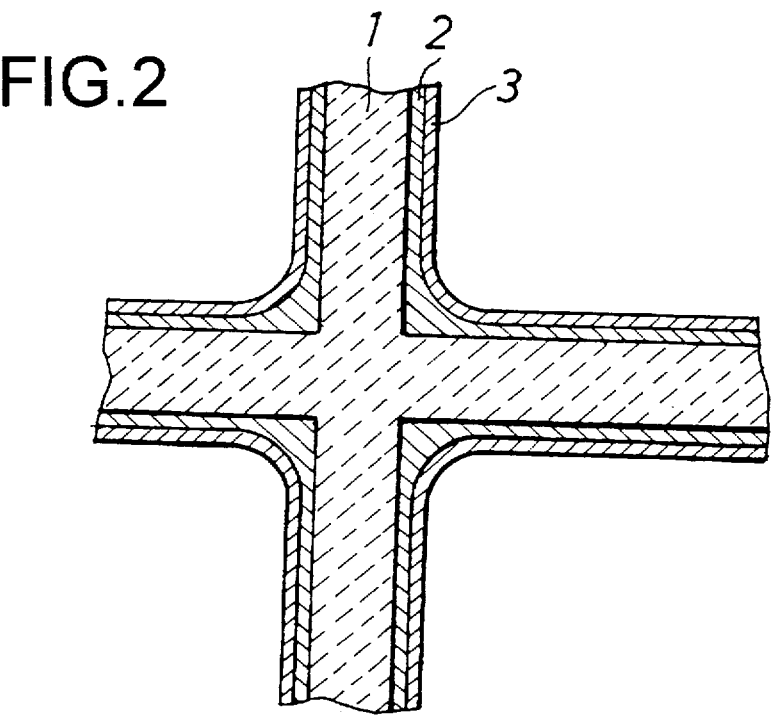

FIG. 2 is a partially enlarged sectional view of the monolith carrier 1. A bottom washcoat layer 2 and a top washcoat layer 3 are sequentially laminated on the surface of the carrier 1. The washcoat layers 2 and 3 are formed in the following manner:

First, the monolith carrier 1 is immersed into a slurry including alumina ($Al_2O_3$) and then dried, thereby forming the bottom washcoat layer 2 made of porous alumina on the surface of the carrier 1. Thereafter, preselected catalyst constituents are deposited onto the bottom washcoat layer 2.

Then, the monolithic carrier 1 is immersed into a slurry including alumina and dried, thereby forming a top washcoat layer 3 made of porous alumina on the bottom washcoat layer 2, followed by deposition of preselected catalyst constituents on the top washcoat layer 3.

The catalyst constituents carried in the bottom washcoat layer 2 are at least cerium, zirconium and palladium, and the catalyst constituents carried in the top washcoat layer 3 are at least platinum, rhodium, barium (Ba) and cerium, but no palladium and zirconium are carried in the top washcoat layer 3.

It is known that palladium carried in the bottom washcoat layer 2 and platinum carried in the top washcoat layer 3 each act as a catalyst for oxidation of hydrocarbons in an exhaust gas. Platinum shows a high activity for the oxidation of unsaturated hydrocarbons, and palladium shows a high activity for the oxidation of saturated hydrocarbons. Therefore, if both of platinum and palladium are allowed to act separately, an exhaust gas including unsaturated and saturated hydrocarbons can be purified effectively.

However, as can be seen from Table 1 showing the temperature for 50% conversion of hydrocarbons, carbon monoxide and nitrogen oxide, the addition of palladium to the washcoat layer including platinum and rhodium causes a deterioration in performance, particularly at a high temperature.

TABLE 1

|  | Temperature (°C.) for 50% conversion ($\lambda = 1.00$) | | |
| --- | --- | --- | --- |
|  | HC | CO | $NO_x$ |
| Pt, Rh (980° C. aged) | 344 | 344 | 326 |
| Pt, Pd, Rh (980° C. aged) | 371 | 362 | 363 |

The deterioration in performance is caused by the formation of a platinum-palladium alloy having a low activity for hydrocarbons at a high temperature. Thereupon, if palladium is carried in the bottom washcoat layer 2, and platinum and rhodium are carried in the top washcoat layer 3, so as to keep palladium and platinum from direct contact with each other, it is then possible to inhibit the formation of such a platinum-palladium alloy and prevent any deterioration in hydrocarbon conversion performance at a high temperature. The above-described effect is apparent from Table 2 showing hydrocarbon and carbon monoxide % conversion at 500° C.

TABLE 2

|  | % Conversion at 500° C. ($\lambda = 0.986$) | |
| --- | --- | --- |
|  | HC | CO |
| Pt, Pd in the same layer (900° C. aged) | 60 | 33 |
| Pt, Pd in separate layers (900° C. aged) | 69 | 49 |

The contents of the above-described noble metal constituents, platinum, rhodium and palladium are as follows:

Platinum: 0.1–2.0 g/l
Rhodium: 0.05–0.65 g/l
Palladium: 0.2–2.0 g/l

To expect a sufficient level of % conversion, the contents exceeding the above-defined lower limits are required. Even if the contents exceed the above-defined upper limits, only a small increase in effect would be expected, but the cost would be increased greatly.

The contents as described throughout the specification are expressed in terms of weight of the catalyst constituents per unit volume of the monolith carrier 1, i.e., grams of catalyst constituents per liter of carrier.

In addition to platinum, rhodium and palladium which are noble metal constituents, various additional catalyst constituents may be carried in the bottom and top washcoat layers 2 and 3, and they exert a large influence to the performance of the exhaust emission control catalyst. These catalyst constituents will be described below in sequence.

1) Cerium (Ce)

As is apparent from Table 3 showing the hydrocarbon % conversion at 450° C., it has been experimentally demonstrated that cerium is effective for the hydrocarbon conversion performance of palladium, but is detrimental to the hydrocarbon conversion performance of rhodium.

TABLE 3

|  | Hydrocarbon % Conversion at 450° C. ($\lambda = 0.93$) |
| --- | --- |
| Pd (on $Ce/Al_2O_3$) | 64 |
| Pd (on $Al_2O_3$) | 51 |
| Rh (on $Ce/Al_2O_3$) | 75 |
| Rh (on $Al_2O_3$) | 96 |

Therefore, a relatively large amount of Ce (10 to 40 g/l) is carried in the bottom washcoat layer 2 which includes palladium carried therein, thereby providing an improvement in hydrocarbon conversion performance of palladium. If the cerium content is less than 10 g/l, the improvement in hydrocarbon conversion performance of palladium is not observed. If the cerium content exceeds 40 g/l, the washcoat layer is liable to be peeled off. Within this acceptable range of cerium contents, in a region in which the cerium content is relatively small, there is primarily expected an improvement in hydrocarbon conversion performance of palladium whereas in a region in which the cerium content is relatively large, an improvement in carbon monoxide and nitrogen oxide conversion performance of palladium is primarily expected. Therefore, it is possible to effectively increase both the hydrocarbon conversion performance by forming the bottom washcoat layer 2 of two distinct layers having different cerium contents.

As described above, while cerium is detrimental to the hydrocarbon conversion performance of rhodium, it is effective to the nitrogen oxide conversion performance of platinum carried in the top washcoat layer 3 together with such rhodium. Thus, if the cerium content in the top washcoat layer 3 is excessively large, the hydrocarbon conversion performance of rhodium is injured thereby. If the cerium content in the top washcoat layer 3 is excessively small, it in turn injures the nitrogen oxide conversion performance of platinum. Thereupon, by setting the cerium content in the top washcoat layer 3 at a value smaller than that in the bottom washcoat layer 2, both of the hydrocarbon conversion performance of rhodium and the nitrogen oxide conversion performance of platinum can be achieved simultaneously to enable the total exhaust gas purification performance to be exhibited to the maximum.

2) Zirconium (Zr)

If crystals of cerium are exposed to a high temperature, they are sintered to be reduced in their surface area. As a result, the number of active sites of cerium decreases, thereby lowering the effect of promoting the purification of an exhaust gas. Zirconium is carried in the bottom washcoat layer 2 which has a large cerium content in order to prevent the heat deterioration of such cerium, and the zirconium content is set at a value in a range of 5 to 30 g/l. Table 4 shows results obtained by determining an average diameter of the cerium crystals by an X-ray diffraction measurement. As is apparent from Table 4, it has been observed that the size of the cerium crystal remains small, thereby maintaining high surface area, by addition of zirconium.

TABLE 4

| Zirconium Content in cerium oxide (mole %) | Size of Cerium Crystal at 900° C. (nm) |
| --- | --- |
| 0.0 | 35.2 |
| 0.5 | 35.3 |
| 2.5 | 22.3 |
| 5.0 | 15.3 |
| 10.0 | 14.0 |
| 15.0 | 12.5 |

3) Barium (Ba)

Barium is carried in the top washcoat layer 3 in order to provide heat resistance. Barium stabilizes the surface area of alumina and acts on a platinum-cerium catalyst system to increase the activity for carbon monoxide and nitrogen oxides, particularly, in a transient stage of a reducing reaction. The barium content is suitably in a range of 2 to 8 g/l. If the barium content is less than 2 g/l, the expected effect is not obtained. If the barium content exceeds 8 g/l, a composite oxide represented by $BaAl_2O_3$ is formed to decrease the specific surface area of alumina ($Al_2O_3$). An increase in exhaust gas purification effect provided by the addition of barium is given in Table 5.

TABLE 5

| Form of Catalyst | Conversion (%) | | |
| --- | --- | --- | --- |
| | HC | CO | $NO_x$ |
| $Pt/Ce/Al_2O_3$ | 21 | 21 | 32 |
| $Pt/Ba/Ce/Al_2O_3$ | 21 | 31 | 62 |

4) Nickel (Ni)

Nickel has a function to suppress the emission of hydrogen sulfide ($H_2S$) during rich air/fuel ratio conditions. The nickel content is suitably in a range of 2 to 8 g/l. If the nickel content is less than 2 g/l, an expected effect is not obtained. If the nickel content exceeds 8 g/l, a composite oxide represented by $NiAl_2O_4$ is formed to promote the sintering of alumina ($Al_2O_3$). Nickel can be added to either one or both of the bottom and top washcoat layers 2 and 3. The decrease in hydrogen sulfide emission provided by the addition of nickel is given in Table 6.

TABLE 6

| Nickel Content (%) | Peak Hydrogen Sulfide Release (ppm) |
| --- | --- |
| 0.0 | 115 |
| 0.4 | 30 |
| 1.2 | 20 |

Some preferred examples will be described below.

EXAMPLE 1

A monolith carrier 1 with a lower layer of a bottom washcoat layer 2 including 43 g/l of γ-alumina is impregnated with cerium nitrate to provide a cerium loading of 18 g/l. Then, the monolith carrier 1 is coated with an upper layer of the bottom washcoat layer 2 on the lower layer, which includes 30 g/l of γ-alumina, and is impregnated with a solution including a mixture of cerium nitrate, zirconium nitrate and nickel nitrate to provide loadings of 5 g/l of Ce, 11 g/l of Zr and 3.5 g/l of Ni.

Then, the resulting carrier is impregnated with a solution of zirconium nitrate to provide an additional zirconium loading of 11 g/l, and is further impregnated with a solution of palladium nitrate to provide a palladium loading of 1.3 g/l, thereby finishing the bottom washcoat layer 2 comprising the lower and upper layers.

Subsequently, a top washcoat layer 3 including 37 g/l of γ-alumina is formed on the bottom washcoat layer 2. The top washcoat layer 3 is impregnated with a solution of rhodium nitrate to provide a rhodium loading of 0.26 g/l and is further impregnated with a solution including tetraammine platinous chloride and barium acetate to provide loadings of 0.8 g/l of Pt and 5.8 g/l of Ba.

EXAMPLE 2

The lower and upper layers in Example 1 are combined into a single layer to form the bottom washcoat layer 2 as having uniform constituent contents therein.

EXAMPLE 3

Alternative soluble salts of the various elemental constituents other than nitrates used in Examples 1 and 2 are used for deposition of the catalyst constituents onto the washcoat layers 2 and 3.

EXAMPLE 4

The cerium contents in the bottom and top washcoat layers 2 and 3 in Examples 1 and 2 are adjusted.

For example, if the cerium content in the bottom washcoat layer 2 is reduced and the cerium content in the top washcoat layer 3 is increased, the hydrocarbon conversion performances possessed by palladium in the bottom washcoat layer 2 and by rhodium in the top washcoat layer 3 are reduced while the nitrogen oxide conversion performance possessed by platinum in the top washcoat layer 3 is increased. Therefore, by adjusting the cerium content in each of the washcoat layers 2 and 3, the hydrocarbon and nitrogen oxide conversion performances can be balanced whereby an optimal exhaust gas purification performance is obtained as a whole.

EXAMPLE 5

Any or all of the catalyst constituents can be added directly to an appropriate alumina slurry for forming each of the bottom and top washcoat layers 2 and 3.

More specifically, a monolith carrier 1 is immersed into an alumina slurry including cerium, zirconium and nickel, thereby forming a bottom washcoat layer 2 having an alumina loading of 73 g/l, a cerium loading of 18 g/l, a zirconium loading of 11 g/l and a nickel loading of 3.5 g/l. The bottom washcoat layer is impregnated with a solution of palladium nitrate to provide a palladium loading of 1.3 g/l.

Then, the monolith carrier 1 is immersed into an alumina slurry including cerium and nickel, thereby forming a top washcoat layer 3 having an alumina loading of 37 g/l, a cerium loading of 5.3 g/l and a nickel loading of 1.8 g/l. The top washcoat layer is then impregnated with a solution of rhodium nitrate, tetraammine platinous chloride and barium nitrate to provide a rhodium loading of 0.26 g/l, a platinum loading of 0.8 g/l and a barium loading of 5.8 g/l.

Exhaust emission control catalysts prepared according to Examples 1 and 5 and mounted on a vehicle were tested over the US Federal Test Procedure (FTP-75) after accelerated aging on the vehicle. The results of these tests are shown in Table 7. Reference catalyst shown in Table 7 is a commercially available one comprising 1.3 g/l of platinum, 0.26 g/l of rhodium, 35 g/l of cerium, 7 g/l of barium and 9.5 g/l of zirconium.

TABLE 7

|  | Conversion (%) | | |
| --- | --- | --- | --- |
|  | HC | CO | $NO_x$ |
| Reference Catalyst | 86.2 | 8.19 | 92.9 |
| Example 1 | 88.5 | 81.6 | 90.6 |
| Example 5 | 88.4 | 84.2 | 94.6 |

As apparent from Table 7, the exhaust emission control catalysts according to the present invention are superior in hydrocarbon conversion effect relative to the prior art (i.e., reference) exhaust emission control catalyst, and the results in Table 7 demonstrate the ability to properly adjust the selectivity of the catalyst for hydrocarbon and nitrogen oxide conversion effect by adjusting cerium content distribution between the washcoat layers.

What is claimed is:

1. An exhaust emission control catalyst comprising a catalyst carrier, a bottom washcoat layer of alumina and a top washcoat layer of alumina which are sequentially laminated on the catalyst carrier, and catalyst constituents carried in the bottom and top washcoat layers, respectively, said bottom washcoat layer including at least cerium, zirconium and palladium carried therein, at respective contents of cerium in a range of 10 to 40 g/l; zirconium in a range of 5 to 30 g/l; and palladium in a range of 0.2 to 2.0 g/l;

said top washcoat layer including at least platinum, rhodium, barium and cerium carried therein, without palladium and zirconium carried therein, at respective contents of platinum in a range of 0.1 to 2.0 g/l; rhodium in a range of 0.05 to 0.65 g/l; barium in a range of 2 to 8 g/l; and cerium in a content smaller than that in the bottom washcoat layer.

2. An exhaust emission control catalyst according to claim 1, wherein said catalyst carrier is of a ceramic honeycomb structure.

3. An exhaust emission control catalyst according to claim 1, wherein said catalyst carrier is of a metallic honeycomb structure.

4. An exhaust emission control catalyst according to claim 1, wherein cerium, zirconium and palladium are applied separately in forming the bottom washcoat layer.

5. An exhaust emission control catalyst according to claim 1, wherein platinum, rhodium, barium and cerium are applied separately in forming the top washcoat layer.

6. An exhaust emission control catalyst according to claim 1, wherein at least one of cerium, zirconium and palladium are applied in an alumina slurry in forming the bottom washcoat layer.

7. An exhaust emission control catalyst according to claim 1, wherein said bottom washcoat layer is comprised of an inner layer and an outer layer having different cerium contents.

8. An exhaust emission control catalyst according to claim 1, wherein said bottom and/or top washcoat layer has 2 to 8 g/l of nickel carried therein.

9. An exhaust emission control catalyst according to claim 1, wherein at least one of cerium, platinum, rhodium and barium are applied in an alumina slurry in forming the top washcoat layer.

10. An exhaust emission control catalyst according to claim 1, wherein at least one of cerium, zirconium, palladium, platinum, rhodium and barium are previously included in an alumina slurry for forming the bottom or top washcoat layer.

11. An exhaust emission control catalyst comprising a catalyst carrier, a bottom washcoat layer of alumina and a top washcoat layer of alumina which are sequentially laminated on the catalyst carrier, and catalyst constituents carried in the bottom and top washcoat layers, respectively, said bottom washcoat layer including at least cerium, zirconium and palladium carried therein, at respective contents of cerium in a range of 10 to 40 g/l; zirconium in a range of 5 to 30 g/l; and palladium in a range of 0.2 to 2.0 g/l;

said top washcoat layer including at least platinum, rhodium, barium and cerium coexistingly carried therein, without palladium and zirconium carried therein, at respective contents of platinum in a range of 0.1 to 2.0 g/l; rhodium in a range of 0.05 to 0.65 g/l; barium in a range of 2 to 8 g/l; and cerium in a content smaller than that in the bottom washcoat layer.

* * * * *